United States Patent
Giek et al.

(10) Patent No.: US 12,544,980 B2
(45) Date of Patent: Feb. 10, 2026

(54) CONTAINER ARRANGEMENT OF AN UNPACKING DEVICE FOR A MANUFACTURING DEVICE, UNPACKING DEVICE HAVING SUCH A CONTAINER ARRANGEMENT, AND MANUFACTURING DEVICE

(71) Applicant: TRUMPF Laser- und Systemtechnik GmbH, Ditzingen (DE)

(72) Inventors: Daniel Giek, Stuttgart (DE); Wolfgang Laib, Besigheim (DE); Christos Ispikoudis, Leonberg (DE); Manuel Geng, Ueberlingen (DE)

(73) Assignee: TRUMPF LASER- UND SYSTEMTECHNIK GMBH, Ditzingen (DE)

( * ) Notice: Subject to any disclaimer, the term of this patent is extended or adjusted under 35 U.S.C. 154(b) by 424 days.

(21) Appl. No.: 18/304,376

(22) Filed: Apr. 21, 2023

(65) Prior Publication Data
US 2023/0256517 A1     Aug. 17, 2023

Related U.S. Application Data

(63) Continuation of application No. PCT/EP2021/078165, filed on Oct. 12, 2021.

(30) Foreign Application Priority Data

Nov. 2, 2020  (DE) .................. 10 2020 128 789.5

(51) Int. Cl.
*B29C 64/357*     (2017.01)
*B22F 3/00*        (2021.01)
(Continued)

(52) U.S. Cl.
CPC ............ *B29C 64/371* (2017.08); *B22F 3/005* (2013.01); *B22F 10/28* (2021.01); *B22F 12/38* (2021.01);
(Continued)

(58) Field of Classification Search
CPC ..... B29C 64/35; B29C 64/357; B29C 64/371; B29C 64/379
See application file for complete search history.

(56) References Cited

U.S. PATENT DOCUMENTS

2001/0045678 A1* 11/2001 Kubo ...................... B29C 64/35
                                                                                      425/375
2002/0090410 A1*  7/2002 Tochimoto ............ B29C 64/357
                                                                                      425/215
(Continued)

FOREIGN PATENT DOCUMENTS

DE    202013009787 U1   12/2013
DE    102015109848 A1   12/2016
(Continued)

*Primary Examiner* — Timothy Kennedy
(74) *Attorney, Agent, or Firm* — LEYDIG, VOIT & MAYER, LTD.

(57) ABSTRACT

A container arrangement of an unpacking device for a manufacturing device for additive manufacturing of a three-dimensional component is provided. The container arrangement includes a construction container with a construction chamber, and a collecting container that is releasably connected to the construction container and has a collecting chamber. The construction container has a container cover that, in the closed state, seals off the construction chamber and an inert atmosphere located therein from the surroundings. A collecting-container-side part of an interior of the (Continued)

container arrangement is provided inside the container arrangement. The container arrangement further includes an opening device that can be used, with the collecting-container-side part of the interior of the container arrangement being filled with an inert atmosphere, to open the closed container cover of the construction container and thereby to connect the construction chamber of the construction container to the collecting chamber of the collecting container.

16 Claims, 3 Drawing Sheets

(51) Int. Cl.
    *B22F 10/28*     (2021.01)
    *B22F 12/00*     (2021.01)
    *B29C 64/153*    (2017.01)
    *B29C 64/255*    (2017.01)
    *B29C 64/35*     (2017.01)
    *B29C 64/371*    (2017.01)
    *B29C 64/379*    (2017.01)
    *B33Y 30/00*     (2015.01)

(52) U.S. Cl.
    CPC .......... *B29C 64/153* (2017.08); *B29C 64/255* (2017.08); *B29C 64/35* (2017.08); *B29C 64/357* (2017.08); *B29C 64/379* (2017.08); *B22F 2201/10* (2013.01); *B33Y 30/00* (2014.12)

(56) References Cited

U.S. PATENT DOCUMENTS

| | | | |
|---|---|---|---|
| 2006/0214335 A1* | 9/2006 | Cox | B22F 10/28 |
| | | | 425/375 |
| 2007/0026145 A1* | 2/2007 | Lindemann | B29C 64/35 |
| | | | 427/248.1 |
| 2016/0279871 A1 | 9/2016 | Heugel et al. | |
| 2017/0036404 A1* | 2/2017 | Rengers | B33Y 40/00 |
| 2017/0232552 A1* | 8/2017 | Crear | B33Y 30/00 |
| | | | 219/76.11 |
| 2018/0194126 A1 | 7/2018 | Hagedorn et al. | |
| 2020/0038960 A1 | 2/2020 | Laib et al. | |
| 2020/0254526 A1 | 8/2020 | Huber et al. | |

FOREIGN PATENT DOCUMENTS

| | | |
|---|---|---|
| DE | 102017108080 A1 | 10/2018 |
| EP | 3263316 A1 | 1/2018 |
| EP | 3068606 B1 | 4/2020 |
| WO | WO 2019086231 A1 | 5/2019 |

* cited by examiner

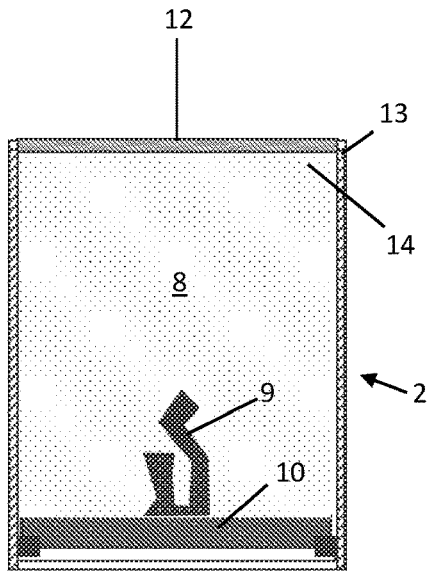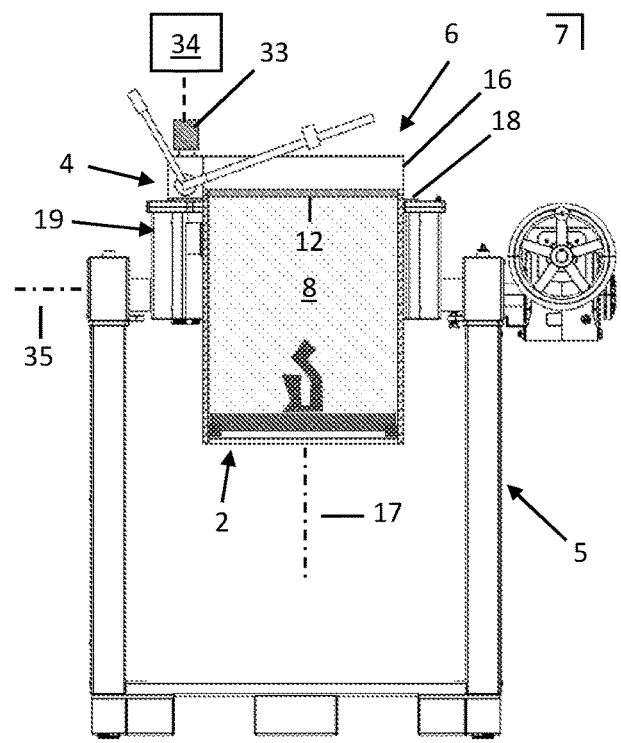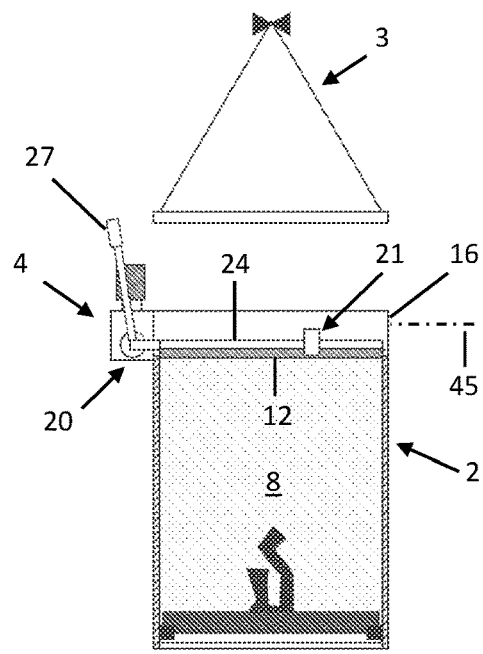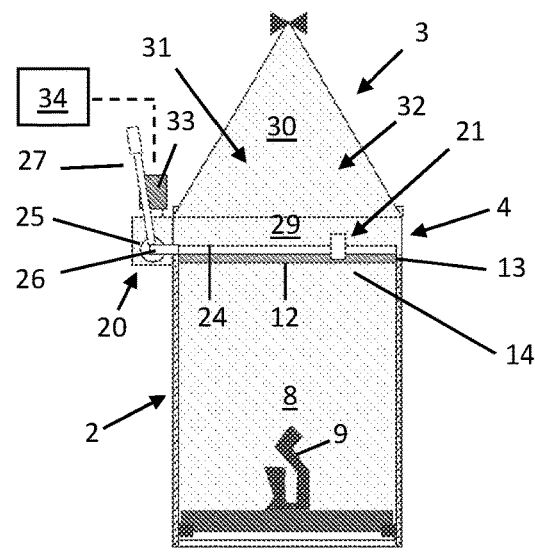
Fig. 2a　　　Fig. 2b
Fig. 2c　　　Fig. 2d

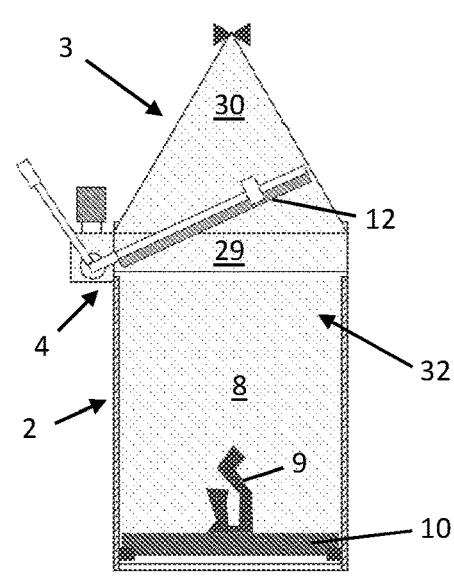
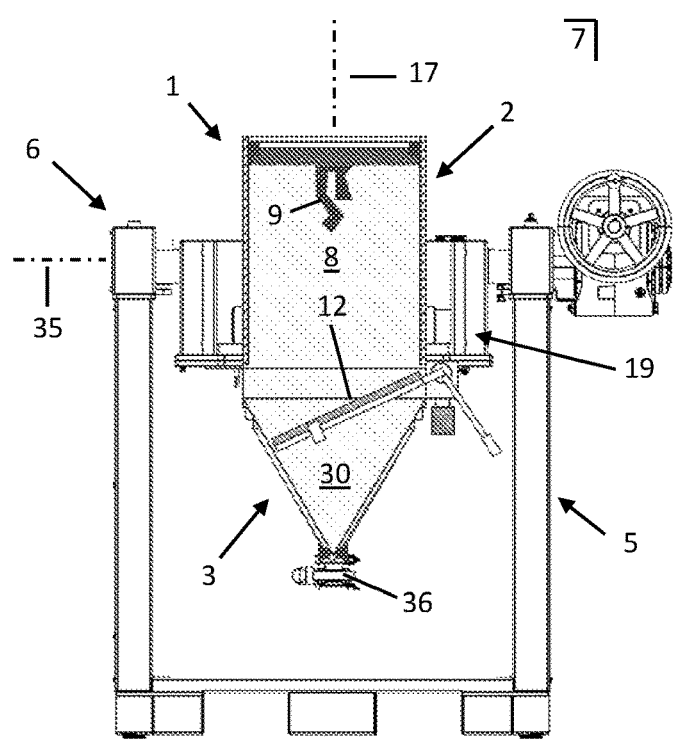
Fig. 2e    Fig. 2f
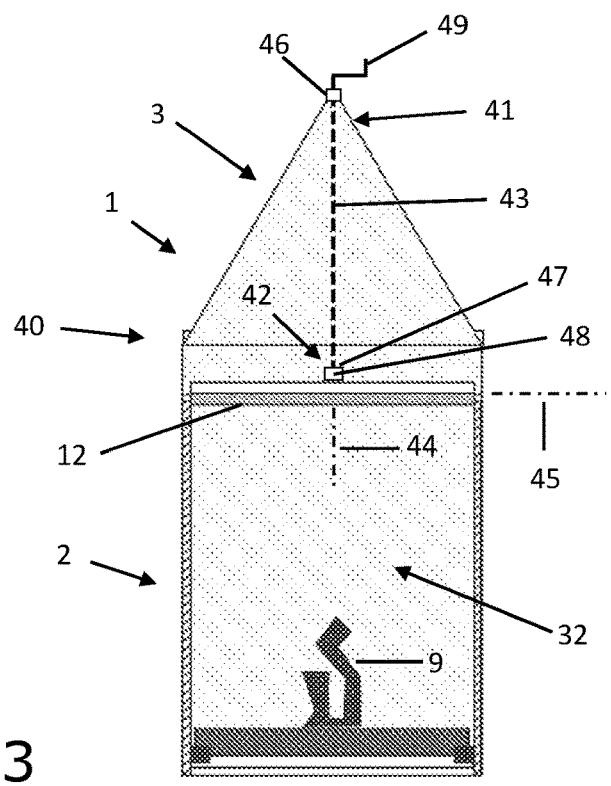
Fig. 3

CONTAINER ARRANGEMENT OF AN UNPACKING DEVICE FOR A MANUFACTURING DEVICE, UNPACKING DEVICE HAVING SUCH A CONTAINER ARRANGEMENT, AND MANUFACTURING DEVICE

CROSS REFERENCE TO RELATED APPLICATIONS

This application is a continuation of International Application No. PCT/EP2021/078165 (WO 2022/089935 A1), filed on Oct. 12, 2021, and claims benefit to German Patent Application No. DE 10 2020 128 789.5, filed on Nov. 2, 2020. The aforementioned applications are hereby incorporated by reference herein.

FIELD

Embodiments of the present invention relate to a container arrangement of an unpacking device for a manufacturing device for additive manufacturing of a three-dimensional component by selectively solidifying pulverulent construction material (construction material powder). Embodiments of the present invention also relate to an unpacking device, which is provided with the container arrangement, and to a manufacturing device having the unpacking device.

BACKGROUND

In the additive manufacturing of a three-dimensional component by selectively solidifying pulverulent construction material in a construction container, after the end of a manufacturing process, the construction container, in addition to the component produced within the scope of the manufacturing process, also contains loose construction material powder due to the process. Unpacking of the component recovers the loose construction material powder for recycling in subsequent manufacturing processes.

Very exacting demands, depending on the application, are imposed on the quality of the construction material powder used for the additive manufacturing. For example, for medical applications or applications in aerospace technology, the construction material powder used for the additive manufacturing has to be protected as substantially as possible against harmful environmental influences. In particular, oxidation of the construction material powder has to be avoided. As a consequence, not only does the manufacturing process have to be carried out in an inert atmosphere, but also during the unpacking of a previously manufactured component from loose construction material powder remaining in the construction container of the manufacturing process, harmful environmental influences on the construction material powder recovered for future manufacturing processes have to be prevented.

Prior art of the type in question is disclosed in EP 3 068 606 B1. This document discloses a laser melting device having an unpacking station. In a process chamber of the laser melting device, a three-dimensional object is produced in an upwardly open construction container by selective fusion and solidifying of construction material powder. After ending of the manufacturing process, the upwardly open construction container with the object contained therein and with the remaining loose construction material powder is transported to the unpacking station and inserted there into a framework which is rotatable about a horizontal axis of rotation. A container cover which is provided with a closable outlet opening and which upwardly closes the construction container after it has been inserted into the framework is located on the framework. By rotation of the framework of the unpacking station about the horizontal axis of rotation, the construction container inserted into the framework is transferred into a position in which the outlet opening of the container cover of the construction container points downwards in the direction of gravity. At the same time, the container cover of the construction container is docked onto a collecting container which is provided with a container cover having an upwardly facing collecting opening. Unpacking of the object arranged in the construction container causes the loose construction material powder to flow under the action of gravity out of the construction container into the collecting container. The collecting container and the construction container docked thereon form a closed and gastight interior which can be filled with protective gas. If the interior of the collecting container and the construction container is filled with protective gas, the object arranged in the construction container can be unpacked from the loose construction material powder in a protective gas atmosphere. However, during the transport from the laser melting device to the unpacking station, the loose construction material powder contained in the upwardly open construction container is exposed to oxidation processes

SUMMARY

Embodiments of the present invention provides a container arrangement of an unpacking device for a manufacturing device for additive manufacturing of a three-dimensional component by selectively solidifying pulverulent construction material. The container arrangement includes a construction container for the manufacturing device. The construction container includes a construction chamber for simultaneously receiving the three-dimensional component that is produced in the construction chamber from construction material powder, and loose construction material powder in an inert atmosphere. The container arrangement further includes a collecting container releasably connected to the construction container. The collecting container includes a collecting chamber for receiving the loose construction material powder originating from the construction chamber of the construction container. The container arrangement further includes an interior formed by the construction chamber of the construction container, and a collecting-container-side part that is arranged outside the construction chamber of the construction container. The interior includes the collecting chamber of the collecting container, and is sealed off from surroundings of the container arrangement. The construction container further includes an openable and closable container cover for the construction chamber. The inert atmosphere of the construction chamber is sealed off from the collecting-container-side part of the interior of the container arrangement by closing the container cover. With the container cover of the construction container being closed, the collecting-container-side part of the interior of the container arrangement is capable of being filled with the inert atmosphere. The container arrangement further includes an opening device for the container cover of the construction container. The opening device is actuable from outside the interior of the container arrangement. With the collecting-container-side part of the interior of the container arrangement being filled with the inert atmosphere, the opening device is configured to open the closed container cover of the construction container with an opening movement in a direction of the collecting chamber of the collecting container, thereby connecting the construction chamber of the construction container to the collecting chamber of the collecting container.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 2a-2f are schematic illustrations for showing the operations during the unpacking of a component contained in the container arrangement according to FIGS. 1a and 1b from loose construction material powder, according to some embodiments, and FIG. 3 shows a movement device of a second design for the container arrangement of an unpacking device of the type shown in FIGS. 1a and 1b, according to some embodiments.

DETAILED DESCRIPTION

Figure 1A:
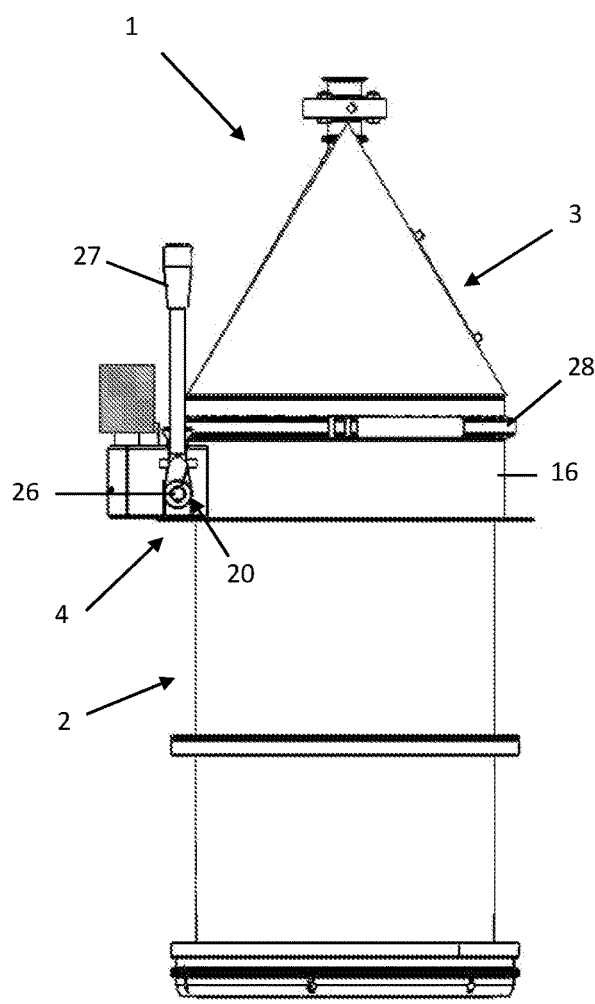
FIG. 1a shows a container arrangement of an unpacking device for a manufacturing device for additive manufacturing of three-dimensional components by selective solidification of pulverulent construction material with a movement device of a first design for opening a container cover of a construction container of the container arrangement, according to some embodiments.

Embodiments of the present invention can permit the recovery of construction material powder contained in a construction container of a manufacturing device for additive manufacturing of a three-dimensional component after the end of a manufacturing process without causing a deterioration in the quality of the construction material powder due to harmful environmental influences, for example due to oxidation processes.

According to some embodiments, the container arrangement includes a construction container for the manufacturing device. The construction container has a construction chamber which is designed for simultaneously receiving the component, which is produced in the construction chamber from construction material powder, and loose construction material powder in an inert atmosphere. The container arrangement also includes a collecting container, which is releasably connected to the construction container and has a collecting chamber for receiving loose construction material powder originating from the construction chamber of the construction container. The container arrangement also includes an interior, which is formed by the construction chamber of the construction container and a collecting-container-side part which is arranged outside the construction chamber of the construction container and comprises the collecting chamber of the collecting container, and which is sealed off from the surroundings of the container arrangement.

According to some embodiments, the construction container has an openable and closable container cover which, in the closed state, seals off a construction chamber of the construction container from its surroundings. The cover of the construction container is closed after the end of a manufacturing process which is carried out in an inert atmosphere at the open construction container and at the end of which the construction chamber of the construction container receives the component produced and loose construction material powder in an inert atmosphere. For example, and depending on the application, nitrogen or argon is usable as the inert gas.

Owing to the hermetic closure of the construction chamber of the construction container by the closed container cover, the construction container closed by the container cover can be transported after the manufacturing process even by an oxygen-containing environment without the quality of the construction material powder contained in the construction container being impaired by oxidation processes.

In order to recover the construction material powder contained in the construction container by unpacking the component arranged in the construction chamber, the construction container is tightly connected to a collecting container of the container arrangement according to embodiments of the invention. The container arrangement on the inside has an interior which is formed by the construction chamber of the construction container, which is initially hermetically sealed by the closed container cover, and by a collecting-container-side part which, for its part, comprises the collecting chamber of the collecting container. The collecting-container-side part of the interior of the container arrangement has a connection for an inert gas supply and can be filled with an inert atmosphere by means of the inert gas supply when the container cover of the construction container is closed. If the collecting-container-side part of the interior of the container arrangement is rendered inert, the initially still closed container cover of the construction container is opened by means of an opening device, which is actuable from outside the interior of the container arrangement, with an opening movement which is carried out in the direction of the collecting chamber of the collecting container. When the container cover is opened, the construction chamber of the construction container filled with the construction material powder to be recovered is connected to the collecting chamber of the collecting container. The entire interior of the container arrangement is filled here with an inert atmosphere, and the construction material powder can flow in an inert environment from the construction chamber of the construction container into the collecting chamber of the collecting container. For this purpose, the container arrangement can be oriented, for example, in such a manner that the construction material powder passes out of the construction chamber of the construction container into the collecting chamber of the collecting container in a manner following gravity. The construction material powder can be sucked out of the collecting chamber of the collecting container, for example, under inert environmental conditions, and supplied for use in a subsequent manufacturing process. Alternatively, there is the possibility of tightly closing the collecting container filled with the construction material powder in an inert atmosphere and of subsequently separating it from the construction container while maintaining the inert atmosphere in the collecting chamber.

In some embodiments, the opening device for the container cover of the construction container has, a drive device, which is actuable from outside the interior of the container arrangement, and a coupling which is provided in the collecting-container-side part of the interior of the container arrangement and via which a drive connection can be produced between the drive device of the opening device and the container cover of the construction container. The coupling in the collecting-container-side part of the interior of the container arrangement comprises a drive-side coupling element, which can be driven by means of the drive device, and a cover-side coupling element assigned to the container cover. If the two coupling elements are connected to each other, the coupling is in a coupling state and the drive device of the opening device according to embodiments of the invention can bring about the opening movement of the container cover of the construction container. In the event of mutual separation of the drive-side coupling element and the cover-side coupling element, the coupling is in a non-operating state and the container cover of the construction container is decoupled from the drive device of the movement device according to embodiments of the invention.

There are a plurality of possibilities for the structural realization of the drive device and of the coupling of the opening device according to embodiments of the invention for the container cover of the construction container.

In particular, a spindle drive which is actuable from outside the interior of the container arrangement or a drive device which is actuable from outside the interior of the container arrangement and has a drive shaft, the shaft axis of which runs parallel to a main plane of the closed container cover, are conceivable as drive devices.

When a spindle drive is used as the drive device, in some embodiments, a coupling can be provided between a threaded spindle of the spindle drive and the container cover of the construction container, which coupling has, on the one hand, a coupling protrusion, for example as an axial extension of the threaded spindle, and, on the other hand, a coupling receptacle, for example on the container cover. The coupling protrusion for transferring the coupling into the coupling state by means of a corresponding switching operation, for example by a cross-sectional widening of the coupling protrusion, can be fixable releasably in the coupling receptacle.

In a preferred embodiment of the invention, a drive shaft running parallel to the closed container cover is provided with a coupling arm which is connected to the drive shaft for conjoint rotation therewith about a shaft axis thereof and which extends over the top side of the container cover in the radial direction of the shaft axis. The coupling arm can be flat and completely or approximately congruent with the container cover to be opened.

Coupling elements of the coupling provided between the drive shaft and the container cover are provided, on the one hand, on the coupling arm and, on the other hand, on the container cover and can be connected to each other for transfer of the coupling into the coupling state.

For this purpose, in particular a conventional rapid clamping connection is provided, which comprises a coupling protrusion as coupling element on one of the components to be coupled and a coupling ring as coupling element on the other of the components to be coupled to each other, said coupling ring receiving the coupling protrusion and being provided with a toggle lever mechanism. By means of in particular manual actuation of the toggle lever mechanism, in the case of the coupling protrusion received in the coupling ring the coupling arm and the container cover can be braced against each other for the transfer of the coupling into the coupling state. In a correspondingly simple manner, a connection existing between the coupling arm and the container cover by means of the rapid clamping connection can be released and the coupling between the drive shaft and the container cover thereby switched into the non-operating state.

The coupling arm connected to the container cover preferably forms, together with the container cover, a constructional unit which is connected releasably to the drive shaft of the drive device. In particular after ending the unpacking operation, the constructional unit consisting of coupling arm and container cover can be handled separately, for example, for cleaning purposes.

In a further advantageous embodiment of the invention, the container cover transferred into a pivoting opening position by means of the drive shaft is lockable in the pivoting opening position. Locking of the pivotally opened container cover is recommended in particular in view of the operations following the opening of the construction chamber of the construction container. In particular, transfer of the container arrangement with the opened container cover into a position in which the construction material powder can leave the construction chamber of the construction container under the action of gravity is conceivable. The locking of the container cover prevents uncontrolled movements of the container cover that are otherwise to be of concern. The container cover is preferably locked by locking the drive shaft against rotational movements about the shaft axis. Via the drive-side coupling element connected to the drive shaft, and/or via the coupling arm connected to the drive shaft for conjoint rotation, the locking of the drive shaft against rotation about the shaft axis causes the container cover to be locked against leaving the pivoting opening position taken up by the container cover. The drive shaft is preferably locked outside the interior of the container arrangement and can then also be released again from outside the interior of the container arrangement.

At the unpacking device according to embodiments of the invention, the container cover, which is locked in the pivoting opening position, can be inclined at an acute angle in relation to the horizontal in the direction of gravity when the container arrangement is correspondingly oriented on the supporting structure of the unpacking device. In this case, the opened container cover forms an oblique plane over which the loose construction material powder originating from the construction chamber of the opened construction container can flow into the collecting container. Undesirable deposits of construction material powder on the side of the container cover which faces the construction chamber of the construction container are avoided in this case.

If the closed container cover on the construction container is placed loosely onto an edge of the container opening closed by the container cover, all that is needed for opening the construction container is the opening movement, which can be realized by means of the opening device according to embodiments of the invention, of the container cover in the direction of the collecting chamber of the collecting container of the container arrangement.

So that the transfer, which is absolutely necessary for producing the opening movement of the container cover, of the coupling between the drive device of the opening device and the container cover of the construction container can be produced functionally reliably, a further inventive design makes provision that the drive-side coupling element and the cover-side coupling element of the coupling can be positioned relative to each other parallel to the main plane of the closed container cover when the container cover is closed (Claim 10). By means of the mutual positioning of the drive-side and of the cover-side coupling elements, the coupling elements are transferred into a coupling standby state, proceeding from which only a switching operation, in the case of the rapid clamping connection according to embodiments of the invention, of the actuation of the toggle lever mechanism, is required in order to produce a drive connection between the drive device of the movement device according to embodiments of the invention and the container cover to be opened.

In particular, features of some embodiments can be used for the retrofittability of existing unpacking devices with the movement device according to embodiments of the invention for opening the container cover of the construction container in an inert environment, according to which inventive feature the opening device according to embodiments of the invention forms a device module which is arranged between the construction container and the collecting container of the container arrangement of the unpacking device.

In order to ensure as complete an unpacking as possible of the component arranged in the construction space of the construction container from the loose construction material powder, in a development of the unpacking device according to embodiments of the invention the container arrangement is mounted on the supporting structure so as to be rotatable about an axis which runs perpendicularly to the closed container cover of the construction container. Additionally or alternatively, the unpacking operation can be assisted by the fact that the component to be unpacked is set into vibration.

A preferred design of the manufacturing device according to embodiments of the invention makes use, for rendering the collecting-container-side part of the interior of the container arrangement inert, which is carried out when the container cover of the construction container is closed, of an inert gas supply which also serves to provide an inert atmosphere in a screening station of the manufacturing device.

Figure 1B:
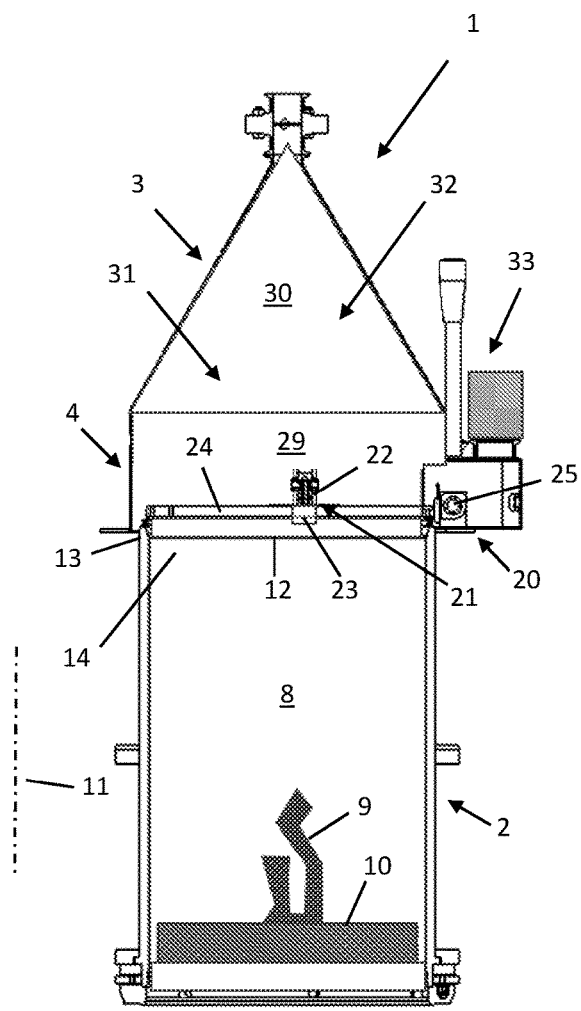
FIG. 1b shows the container arrangement according to FIG. 1a with a transparent wall of the container arrangement according to some embodiments.

According to FIGS. 1a and 1b, a container arrangement 1 comprises a construction container 2, a funnel-shaped collecting container 3 and an opening device 4 arranged between the construction container 2 and the collecting container 3. The opening device 4 is in the form of a device module and is releasably connected to the construction container 2 and to the collecting container 3. The opening device 4 is provided on a supporting structure 5, illustrated in detail in FIGS. 2b and 2f, of an unpacking device 6, which is provided with the container arrangement 1.

The construction container 2 was previously arranged in a process chamber of a manufacturing device 7, illustrated by way of indication in FIGS. 2b and 2f, for additive manufacturing of three-dimensional components by selectively solidifying pulverulent construction material. The basic design and the basic manner of operation of the manufacturing device 7 are described in detail, for example, in WO 2019/086231 A1.

During the time arranged in the process chamber of the manufacturing device 7, a three-dimensional component 9 was produced in a construction chamber 8 of the construction container 2 in a conventional manner from construction material powder, in the present example from metal powder. The component 9 is fastened on a substrate plate 10 which can be raised and lowered along a vertical feed axis 11 in the construction chamber 8 of the construction container 2.

To avoid oxidation of the construction material powder used for manufacturing the component 9, the manufacturing process is carried out in the process chamber of the manufacturing device 7, with the construction container 2 open upwards, in an inert atmosphere, in the present case in a nitrogen atmosphere. After the end of the manufacturing process, the construction container 2 is sealed in the process chamber by a container cover 12. The container cover 12 is placed loosely here onto an edge 13 of a container opening 14.

Owing to a corresponding form fit between the container cover 12 and the edge 13 of the container opening 14, and by means of a sealing ring running in the circumferential direction of the container cover 12, in the example illustrated the construction chamber 8 of the construction container 2 including the inert atmosphere contained therein is sealed off from the surroundings by the closed container cover 12. Additionally or alternatively to a form fit, a force fit between the container cover 12 placed on loosely and the edge 13 of the container opening 14 is suitable for sealing the construction chamber 8 of the construction container 2. The force fit can be produced directly between correspondingly configured, for example conical, contact surfaces of the container cover 12 and the edge 13 of the container opening 14 because of the dead weight of the container cover 12. A force fit because of a flat seal placed between the container cover 12 and the edge 13 of the container opening 14 is also conceivable.

Due to the process, the construction chamber 8 contains loose construction material powder in addition to the component 9, which is produced there, and the inert atmosphere of the manufacturing process. The filling level of the loose construction material powder inside the construction chamber 8 of the construction container 2 reaches here at least as far as the upper end of the component 9 remote from the substrate plate 10. Within the scope of the manufacturing process, after the component 9 is produced, further construction material powder layers are repeatedly applied to the loose construction material powder present to the level of the upper end of the component 9 as protective layers for the construction material powder located below them. In particular, these protective layers inside the construction container 2 would be exposed, without the closed container cover 12, to harmful environmental influences during the transport of the construction container 2 from the process chamber of the manufacturing device 7 to the unpacking device 6.

An inert atmosphere is symbolized in FIGS. 2a to 2f by dots in the relevant chambers of the container arrangement 1. The loose construction material powder is not illustrated specifically in the drawings.

In the state shown in FIG. 2a, the construction container 2 is removed from the process chamber of the manufacturing device 7 and, with the container cover 12 remaining closed, is transported through an oxygen-containing environment to the unpacking device 6 and inserted there into the supporting structure 5 (FIG. 2b). The container cover 12 placed on loosely can temporarily be locked in the sealing position on the edge 13 of the construction container 2 during the transport in order to prevent loss or undesirable slipping of the container cover 12. The locking of the container cover 12 is optionally released again at the unpacking device 6.

The supporting structure 5 is provided with the opening device 4. The construction container 2 is connected by the edge 13 of the container opening 14 gas tightly to an annular wall 16 of the opening device 4. The construction container 2 is mounted together with the opening device 4 on a rotary ring 18, which is rotatable about a vertical axis of rotation 17, of a container holder 19 of the supporting structure 5.

The opening device 4 serves for lifting the container cover 12 off the edge 13 of the container opening 14. The opening device 4 comprises a drive device 20 and a coupling 21 provided between the drive device 20 and the container cover 12. The coupling 21 is designed as a conventional rapid clamping connection with a coupling ring 22 as drive-side coupling element and a coupling protrusion 23 as cover-side coupling element (FIG. 1b).

The coupling ring 22 is attached together with a conventional toggle lever mechanism, for the actuation thereof, to a coupling arm 24 which, for its part, sits on a drive shaft 25 of the drive device 20 and is connected to the drive shaft 25 for conjoint rotation about a shaft axis 26. The connection between the coupling arm 24 and the drive shaft 25 is releasable. The coupling protrusion 23 is part of the container cover 12.

In a conventional manner, the coupling arm 24 and the container cover 12 can be braced against each other or released from each other by means of the toggle lever mechanism and, as a result, the coupling 21 formed by the coupling ring 22 and the coupling protrusion 23 can be switched into a coupling state or into a release date. For mutual orientation of the coupling ring 22 and of the coupling protrusion 23 parallel to a main plane 45 of the closed container cover 12, a part of the coupling arm 24 that is provided with the coupling ring 22 and the associated toggle lever mechanism can be positioned relative to the remaining portion of the coupling arm 24 parallel to the main plane 45 of the container cover 12.

The drive shaft 25 can be driven about the shaft axis 26 by means of a hand lever 27 running perpendicularly to the shaft axis 26 and mounted on the drive shaft for rotation therewith.

After the insertion of the construction container 2, which is closed by the container cover 12, into the supporting structure 5 of the unpacking device 6 and the gastight connection of the edge 13 of the container opening 14 to the wall 16 of the opening device 4 (FIG. 2b), the coupling arm 24 of the container opening 14 is pivoted against the container cover 12 via the drive shaft 25, which is rotated about the shaft axis 26, by corresponding actuation of the hand lever 27, and a connection is produced between the drive-side coupling ring 22 and the cover-side coupling protrusion 23 of the coupling 21 by means of the toggle lever mechanism (FIG. 2c). The container cover 12 is closed as before and also seals off the construction chamber 8 of the construction container 2 and the inert atmosphere of the construction chamber 8 contained therein from the surroundings.

When the container cover 12 is closed and the drive device 20 coupled to the container cover 12, the funnel-shaped collecting container 3, as indicated in FIG. 2c, is placed onto the wall 16 of the opening device 4. After being placed on, the collecting container 3 is connected tightly to the opening device 4 by means of a clamping ring 28 (FIG. 1a). The conditions illustrated specifically in FIGS. 1a and 1b therefore arise. The inert atmosphere in the interior of the construction chamber 8 is not shown in FIG. 1b.

The construction chamber 8 of the construction container 2 containing the previously produced component 9 and loose construction material powder in an inert atmosphere is now sealed off from an interior 29 of the opening device 4 and a collecting chamber 30 of the funnel-shaped collecting container 3 by the closed container cover 12 (FIG. 1b). The interior 29 of the opening device 4 and the collecting chamber 30 of the collecting container 3 form a collecting-container-side part 31 of an interior 32 of the container arrangement 1 formed by the construction chamber 8 of the construction container 2, the interior 29 of the opening device 4 and the collecting chamber 30 of the collecting container 3.

Only the axial ends of the drive shaft 25 outside the interior 29 are arranged on the opening device 4. The hand lever 27 is attached to one of the ends of the drive shaft 25 lying outside the interior 29.

A valve arrangement 33 is placed from the outside onto the wall 16 of the opening device 4. An inlet side of the valve arrangement 33 is connected to an inert gas supply 34 of the manufacturing device 7. The inert gas supply 34 furthermore serves to provide the inert atmosphere, which is required for the manufacturing process, in the process chamber of the manufacturing device 7, specifically in a screening station of the process chamber. In addition, the valve arrangement 33 comprises an oxygen sensor, not illustrated in detail in the figures.

In the functional state of the container arrangement 1 illustrated in FIGS. 1a and 1b, the inert gas supply 34 of the manufacturing device 7 is used, when the container cover 12 of the construction container 2 is closed, to feed inert atmosphere into the collecting-container-side part 31 of the interior 32 of the container arrangement 1, and forces the oxygen-containing atmosphere contained to date in the collecting-container-side part 31 of the interior 32 out of the collecting-container-side part 31 of the interior 32. The supply of inert gas is stopped as soon as the oxygen sensor of the valve arrangement 33 detects an oxygen-free or at least approximately oxygen-free atmosphere inside the collecting-container-side part 31 of the interior 32. The conditions therefore arising are illustrated in FIG. 2d.

Proceeding from these conditions, the drive device 20 of the opening device 4 is now actuated from outside the interior 32 of the container arrangement 1 by means of the hand lever 27 and, by pivoting of the coupling arm 24 about the shaft axis 26 of the drive shaft 25, the container cover 12 is lifted off from the edge 13 of the container opening 14 with an opening pivoting movement into the pivoting opening position according to FIG. 2e.

After transfer of the container cover 12 into the pivoting opening position, the drive shaft 25 is locked against rotation about the shaft axis 26 and, as a result, the container cover 12 is locked in the pivoting opening position. For this purpose, a manually actuated latching device, not illustrated in the drawings, is provided with a latching pin which is guided outside the interior 32 of the container arrangement 1 on the wall 16 of the opening device 4 in the radial direction of the drive shaft 25 and which latches in a latching opening of the drive shaft 25 under the action of a latching spring in order to lock the drive shaft 25. To release the locking of the container cover 12, the latching pin has to be pulled back manually out of the latching opening of the drive shaft 25 counter to the action of the latching spring.

When the container cover 12 is opened, the construction chamber 8 of the construction container 2 is now connected to the collecting chamber 30 of the collecting container 3 via the interior 29 of the opening device 4. The substrate plate 10 with the component 9 fastened thereto is locked in the interior of the construction container 2 in the position illustrated in FIG. 2e.

By rotation of the container holder 19 of the unpacking device 6 about a horizontal container pivot axis 35 (FIGS. 2b and 2f), the container arrangement 1 is now pivoted out of the previously taken up starting position into an unpacking position, illustrated in FIG. 2f. The loose construction material powder contained up to this time in the construction chamber 8 of the construction container 2 can now flow off into the collecting chamber 30 of the collecting container 3. The container cover 12 which is locked in the opened position acts here as an oblique plane along which the loose construction material powder moves. To implement the unpacking operation, the container arrangement 1 can be rotated, with the container cover 12 opened, about the axis of rotation 17 of the container holder 19. In addition, the component 9 can be set into vibration via the substrate plate 10.

To empty the collecting chamber 30 of the collecting container 3, a suction line, not shown, is connected to a valve arrangement 36 on the tip of the collecting container 3, via which suction line the loose construction material powder which has passed out of the construction chamber 8 of the construction container 2 into the collecting chamber 30 of the collecting container 3 is sucked off.

After the component 9 has been unpacked from the loose construction material powder, the container arrangement 1 is pivoted back out of the unpacking position into the starting position about the horizontal container pivot axis 35. In the starting position of the container arrangement 1, the clamping ring 28 fixing the collecting container 3 to the opening device 4 is released and the collecting container 3 is removed from the rest of the container arrangement 1. The container cover 12 and the coupling arm 24, which is fixed to the container cover 12 via the coupling 21, are now separated as a constructional unit from the drive shaft 25 of the drive device 20 by the releasable connection between the drive arm 24 and the drive shaft 25 being released. After removal of the coupling arm 24 and of the container cover 12, the container opening 14 of the construction container 2 is free for removal of the component 9. By means of a conventional lifting device acting on the substrate plate 10, the component 9 is lifted out of the position illustrated in the figures in the construction chamber 8 of the construction container 2 into a position in the vicinity of the container opening 14. Starting from the position in the vicinity of the container opening 14, the component 9 is finally removed manually from the construction container 2.

An opening device 40 differing structurally from the opening device 4 of FIGS. 1a to 2f is illustrated in FIG. 3. The opening device 40 comprises a drive device 41 and a coupling 42 between the drive device 41 and the container cover 12 of the construction container 2.

A spindle drive with a threaded spindle 43 is provided as the drive device 41. A spindle axis 44 of the threaded spindle 43 runs perpendicularly to the main plane 45, indicated by chain-dotted lines in FIG. 3, of the closed container cover 12. The threaded spindle 12 meshes with a spindle nut 46 which, for its part, is mounted on the collecting container 3. A coupling protrusion 47 at a cover-side end of the threaded spindle 43 is provided as the drive-side coupling element and engages in a coupling receptacle 48 which, for its part, is open towards the coupling protrusion 47 of the threaded spindle 43 and, as the cover-side coupling element of the coupling 42, is attached to the top side of the container cover 12.

By means of a conventional clamping device, not illustrated specifically, the coupling protrusion 47 of the threaded spindle 43, by widening of the cross section thereof in the coupling receptacle 48, can be effectively fixed along the spindle axis 44 and the coupling 42 formed by the coupling protrusion 47 and the coupling receptacle 48 thereby transferred into the coupling state. To actuate the drive device 41, a hand crank 49 is attached to the threaded spindle 43 outside the interior 32 of the container arrangement 1. If the coupling 42 is switched into the coupling state and a rotational movement of the threaded spindle 43 is produced in an opening direction of rotation by means of the hand crank 49, the container cover 12 is opened with a linear opening movement along the spindle axis 44.

Before the final removal of the component 9 from the construction container 2, the container cover 12 is removed in a constructional unit together with the collecting container 3 from the rest of the container arrangement 1.

Furthermore, the handling of the container arrangement 1 provided with the opening device 40 corresponds to the handling described specifically above of the container arrangement 1 with the opening device 4.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A container arrangement of an unpacking device for a manufacturing device for additive manufacturing of a three-dimensional component by selectively solidifying pulverulent construction material, the container arrangement comprising:
   a construction container for the manufacturing device, the construction container comprising a construction chamber for simultaneously receiving the three-dimensional component that is produced in the construction chamber from construction material powder, and loose construction material powder in an inert atmosphere,
   a collecting container releasably connected to the construction container, the collecting container comprising a collecting chamber for receiving the loose construction material powder originating from the construction chamber of the construction container, and
   an interior formed by the construction chamber of the construction container and a collecting-container-side part that is arranged outside the construction chamber of the construction container, wherein the interior comprises the collecting chamber of the collecting container, and the interior is sealed off from surroundings of the container arrangement,
   wherein
   the construction container comprises an openable and closable container cover for the construction chamber, and the inert atmosphere of the construction chamber is sealed off from the collecting-container-side part of the interior of the container arrangement by closing the container cover,
with the container cover of the construction container being closed, the collecting-container-side part of the interior of the container arrangement is capable of being filled with the inert atmosphere,
the container arrangement further comprising an opening device for the container cover of the construction container, wherein the opening device is actuable from outside the interior of the container arrangement, wherein, with the collecting-container-side part of the interior of the container arrangement being filled with the inert atmosphere, the opening device is configured to open the closed container cover of the construction container with an opening movement in a direction of the collecting chamber of the collecting container, thereby connecting the construction chamber of the construction container to the collecting chamber of the collecting container.

2. The container arrangement according to claim 1, wherein the opening device for the container cover of the construction container comprises a drive device that is actuable from outside the interior of the container arrangement, and a switchable coupling arranged in the collecting-container-side part of the interior of the container arrangement between the drive device and the container cover,
wherein the coupling comprises a drive-side coupling element that is assigned to the drive device and is capable of being driven by the drive device, and a cover-side coupling element assigned to the container cover, and wherein the coupling is capable of being switched into a coupling state or into a non-operating state,
wherein, with the coupling being switched into the coupling state, the drive-side coupling element and the cover-side coupling element are connected to each other and the coupling that is switched into the coupling state produces a drive connection between the drive device and the container cover via the drive-side coupling element and the cover-side coupling element, wherein the drive connection enables the container cover) to be opened with the opening movement by the drive device, and
wherein, with the coupling being switched into the non-operating state, the drive-side coupling element and the cover-side coupling element are separated from each other, thereby separating the drive device and the container cover from each other.

3. The container arrangement according to claim 2, wherein
the drive device of the opening device for the container cover of the construction container comprises a spindle drive with a threaded spindle that has a spindle axis running perpendicularly to a main plane of the closed container cover, and the spindle is capable of being driven from outside the interior of the container arrangement with a rotational movement about the spindle axis relative to a spindle nut attached to the collecting container and thereby is movable along the spindle axis,
the drive-side coupling element of the coupling between the spindle drive and the container cover comprises an axial coupling extension at a cover-side end of the threaded spindle, and the cover-side coupling element is arranged on a top side of the container cover remote from the construction chamber of the construction container, wherein, one of the axial coupling extension of the threaded spindle and the cover-side coupling element is configured as a coupling protrusion running along the spindle axis, and the other one of the axial coupling extension of the threaded spindle and the cover-side coupling element is configured as a coupling receptacle that is open along the spindle axis toward the coupling protrusion,
the coupling is capable of being switched into the coupling state due to the coupling protrusion being fixable along the spindle axis in the coupling receptacle, and
the coupling that is switched into the coupling state, between the spindle drive and the container cover, produces the drive connection, thereby, during the rotational movement of the threaded spindle in an opening direction of rotation, the container cover is capable of being opened with a linear opening movement along the spindle axis.

4. The container arrangement according to claim 2, wherein
the drive device of the opening device for the container cover of the construction container comprises a drive shaft that has a shaft axis running parallel to a main plane of the closed container cover, and the drive shaft is capable of being driven from outside the interior of the container arrangement with a rotational movement about the shaft axis,
the drive-side coupling element of the coupling between the drive device and the container cover is connected in terms of movement to the drive shaft of the drive device and is pivotable about the shaft axis due to the rotational movement of the drive shaft, and
the coupling that is switched into the coupling state produces the drive connection between the drive shaft of the drive device and the container cover via the drive-side coupling element and the cover-side coupling element, the drive connection enables, during the rotational movement of the drive shaft in an opening direction of rotation, the container cover to be opened with an opening pivoting movement about the shaft axis.

5. The container arrangement according to claim 4, wherein
the drive-side coupling element of the coupling between the drive device and the container cover is arranged on a coupling arm that is connected to the drive shaft for conjoint rotation about the shaft axis and extends in a radial direction of the shaft axis over a top side of the container cover remote from the construction chamber of the construction container, and
the cover-side coupling element of the coupling is arranged on the top side of the container cover.

6. The container arrangement according to claim 5, wherein the coupling between the drive device and the container cover is configured as a rapid clamping connection between the coupling arm and the container cover.

7. The container arrangement according to claim 4, wherein, due to the rotational movement of the drive shaft in the opening direction of rotation, the container cover is capable of being opened into a pivoting opening position, wherein a main plane of the opened container cover runs at an acute angle in relation to the main plane of the closed container cover, and the opened container cover is lockable in the pivoting opening position.

8. The container arrangement according to claim 7, wherein the opened container cover is lockable in the pivoting opening position by the drive-side coupling element of the coupling that is switched into the coupling state, between the drive device and the container cover being lockable in a corresponding pivoting position about the shaft axis of the drive shaft.

9. The container arrangement according to claim 2, wherein the closed container cover rests loosely on a container opening of the construction container, the container opening being sealed by the closed container cover.

10. The container arrangement according to claim 2, wherein the drive-side coupling element and the cover-side coupling element of the coupling between the drive device and the container cover, prior to the switching into the coupling state with the container cover being closed, are capable of being positioned relative to each other parallel to the main plane of the closed container cover, and thereby are capable of being transferred into a coupling standby state.

11. The container arrangement according to claim 1, wherein the opening device for the container cover of the construction container forms a device module that is arranged between the construction container and the collecting container and is releasably connected to the construction container and to the collecting container.

12. An unpacking device for a manufacturing device for additive manufacturing of a three-dimensional component by selectively solidifying pulverulent construction material, the unpacking device comprising:
   a container arrangement according to claim 1, wherein the container arrangement comprises a construction container and a collecting container, wherein the construction container comprises a construction chamber configured for simultaneously receiving the component produced in the construction chamber from construction material powder and loose construction material powder in an inert atmosphere, and wherein the collecting container comprises a collecting chamber for receiving the loose construction material powder originating from the construction chamber of the construction container, and
   a supporting structure for the container arrangement, the container arrangement is releasably connected to the supporting structure, and through the supporting structure, the container arrangement is capable of being transferred from a starting position in which the collecting container is arranged above the construction container in the direction of gravity, into an unpacking position in which the collecting container is arranged below the construction container in the direction of gravity.

13. The unpacking device according to claim 12, wherein the container arrangement is mounted on the supporting structure so as to be rotatable about an axis perpendicular to the main plane of the closed container cover of the construction container.

14. The unpacking device according to claim 12, wherein
   the container arrangement is capable of being transferred from the starting position into the unpacking position by mounting the container arrangement on the supporting structure so as to be pivotable about a horizontal container pivot axis, and
   the container arrangement is pivotable about the horizontal container pivot axis into the unpacking position in which the opened container cover of the construction container is inclined downwards at an acute angle in relation to the horizontal container pivot axis.

15. A manufacturing device for additive manufacturing of a three-dimensional component by selectively solidifying pulverulent construction material, the manufacturing device comprising:
   a manufacturing unit configured for producing the component in an inert atmosphere in a construction chamber of a construction container from construction material powder, and
   an unpacking device according to claim 12 for unpacking the component that is received in the construction chamber of the construction container, from construction material powder received in the construction chamber of the construction container.

16. The manufacturing device according to claim 15, wherein:
   the manufacturing unit comprises a screening station for providing the construction material powder for the construction container, and the screening station is provided with an inert gas supply for producing the inert atmosphere of the manufacturing unit, and
   the collecting-container-side part of the interior of the container arrangement of the unpacking device is capable of being filled with the inert atmosphere by the inert gas supply of the screening station of the manufacturing unit.

* * * * *